United States Patent [19]

Terzian

[11] 4,176,593
[45] Dec. 4, 1979

[54] COOKING DEVICE

[75] Inventor: Rouben T. Terzian, Chicago, Ill.

[73] Assignee: Marvin Glass & Assoc., Chicago, Ill.

[21] Appl. No.: 933,266

[22] Filed: Aug. 14, 1978

[51] Int. Cl.² ............................................ A47J 37/10
[52] U.S. Cl. ...................................... 99/422; 126/390
[58] Field of Search ................ 99/422, 372, 373, 374, 99/376, 377, 379, 380, 424; 126/390

[56] References Cited

U.S. PATENT DOCUMENTS

| | | | |
|---|---|---|---|
| 602,101 | 4/1898 | Perry | 99/380 X |
| 740,050 | 9/1903 | Shults | 99/380 |
| 951,065 | 3/1910 | Ferguson | 99/376 X |
| 1,490,177 | 4/1924 | Matson | 99/376 |
| 1,879,010 | 9/1932 | Antrim | 99/374 X |
| 2,314,872 | 3/1943 | Dickey | 99/424 X |
| 2,722,173 | 11/1955 | Cunningham | 126/390 X |
| 3,377,942 | 4/1968 | Carbon | 99/374 X |

FOREIGN PATENT DOCUMENTS 224904 of 1925 United Kingdom ...................... 99/376

*Primary Examiner*—Harvey C. Hornsby
*Assistant Examiner*—Arthur O. Henderson

[57] ABSTRACT

A device for cooking food, such as an omelette or the like, includes a base portion for supporting the device above a suitable surface, such as a countertop or table. A heat conductive grid or surface is mounted on the base and includes one or more controllable heating elements which may be removably connected to a source of electrical energy. Two cooking pans or skillets ae positionable on the heating grid and aligned thereon by suitable guides which may be integrally molded with the grid. Each pan includes an insulated, grippable handle portion to facilitate handling thereof when the pan portion is heated by the grid. One of the pans includes a connecting flange for pivotally coupling the pan to a hinge secured generally in the center of the heating grid to allow pivoting of said pan about the hinge. This arrangement permits omelette batter, for example, to be partially cooked in each of the pans and facilitates flipping of one half of the omelette onto the other half by rotation of the pivoted pan about the hinge.

8 Claims, 9 Drawing Figures

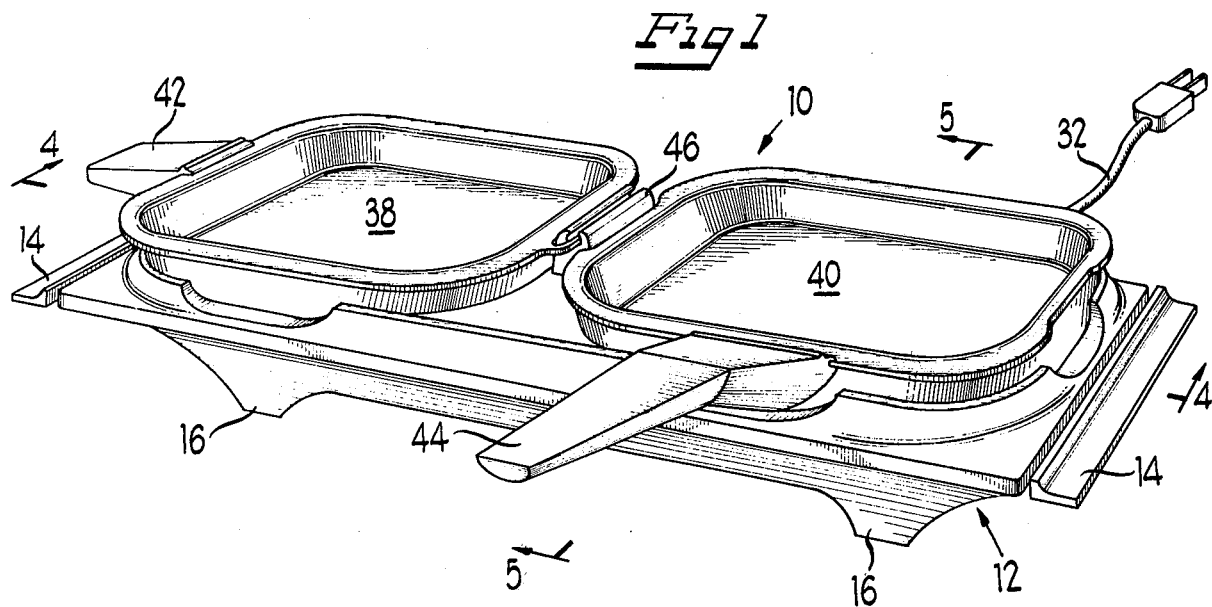
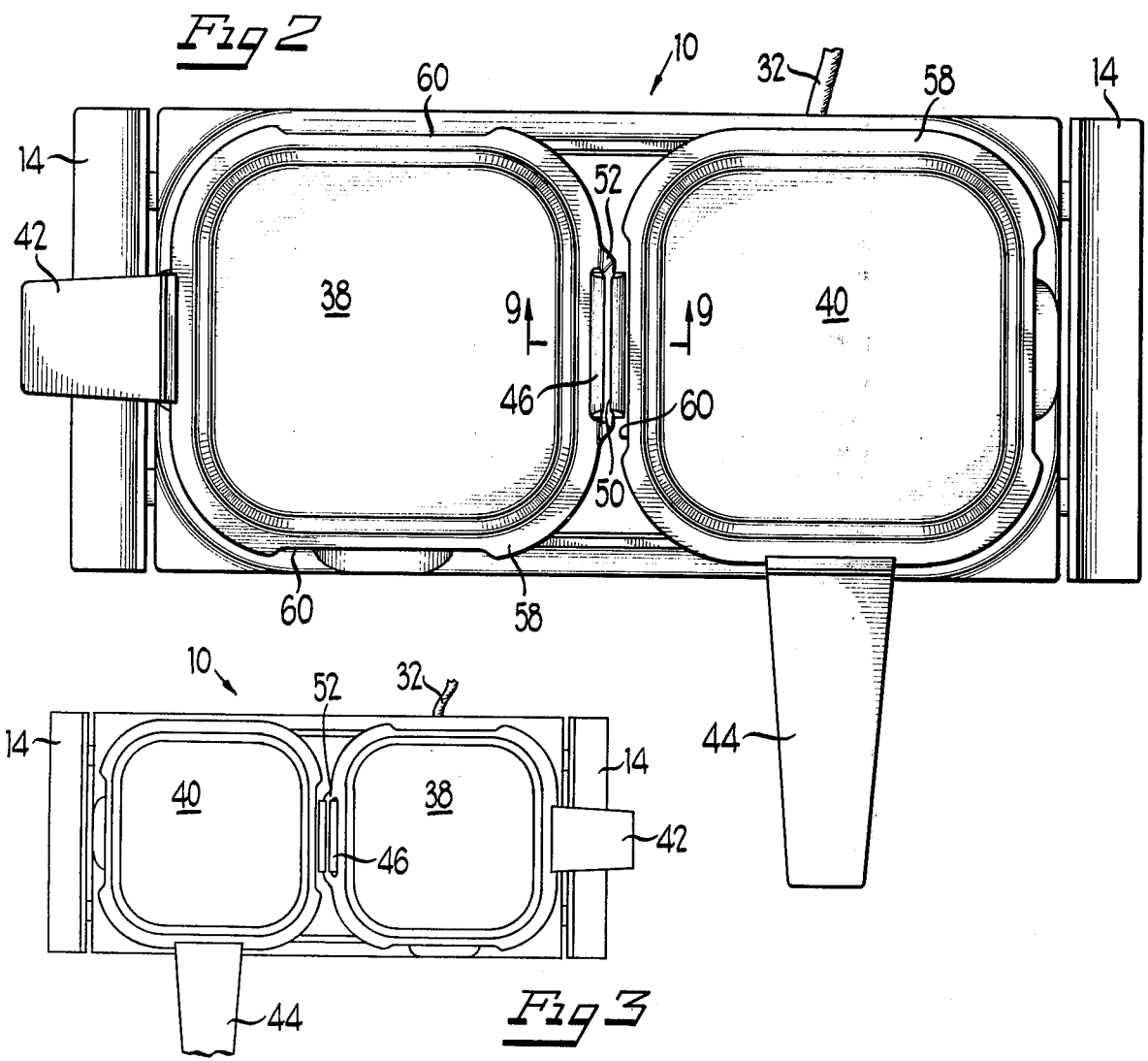

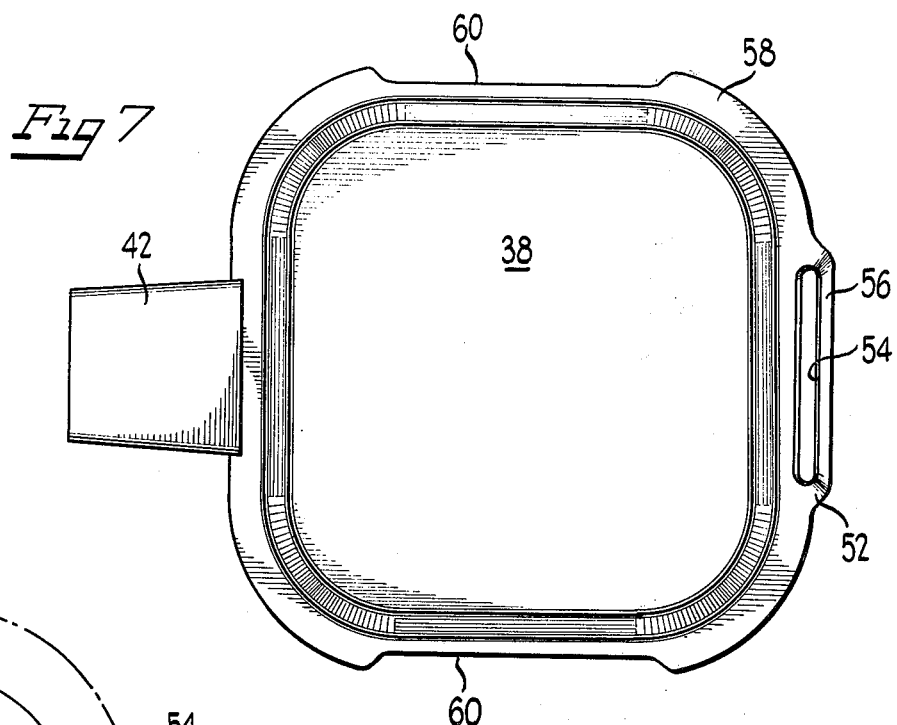
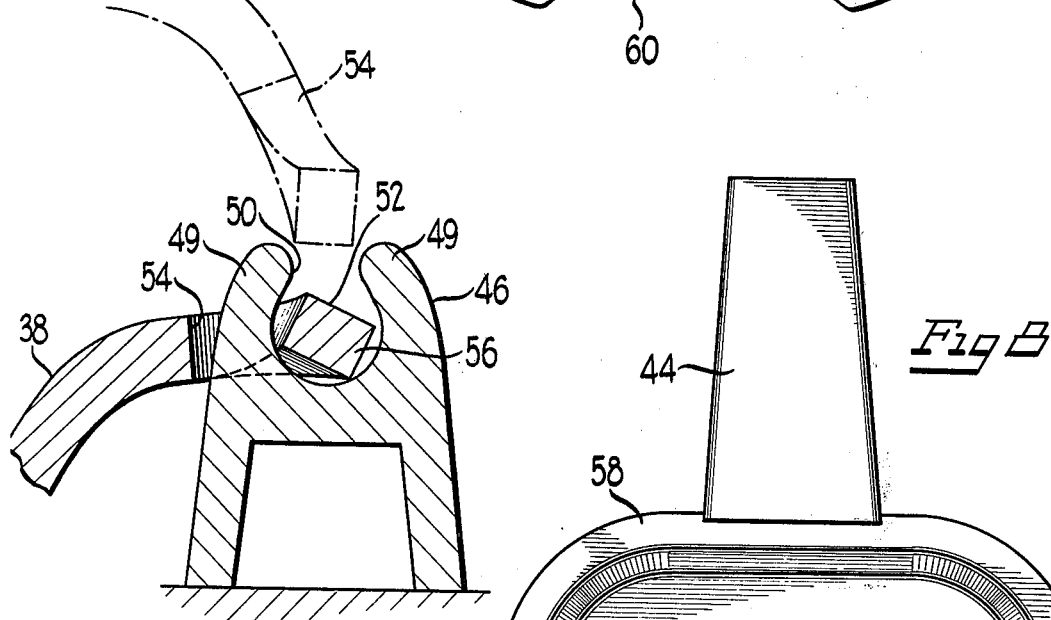
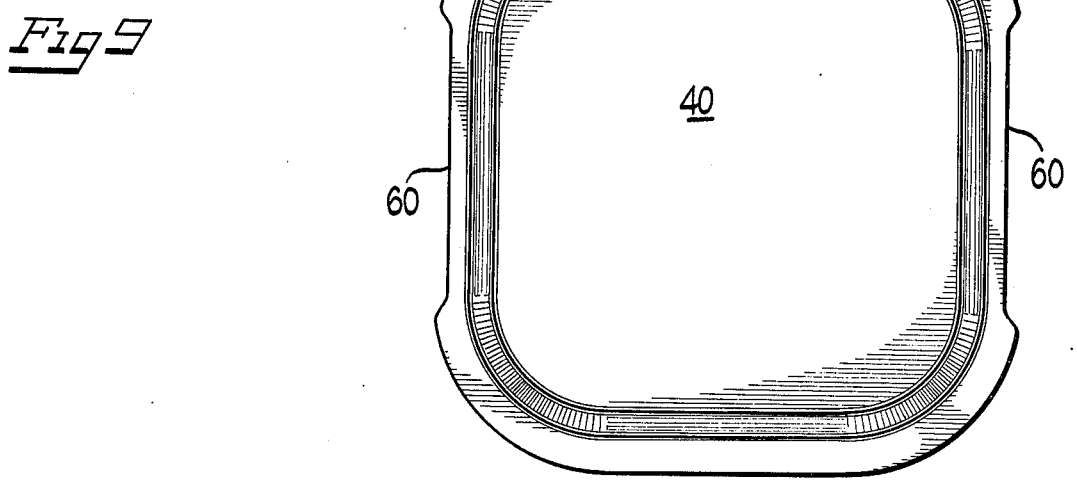

COOKING DEVICE

BACKGROUND OF THE INVENTION

1. Field of the Invention

The present invention relates to a new and improved device for cooking foods and in particular to a device for the preparation of omelettes.

2. Brief Description of the Prior Art

Many specialized cooking implements have been successfully manufactured and sold during recent years. For convenience purposes, many people desire a specialized electrical cooking device for cooking foods such as hamburgers, hot dogs, popcorn, doughnuts, or the like. These devices are preferably portable and easily cleaned and are designed specifically to cook a specific type of food or foods.

Typical prior art devices of this type include a covered pan-like structure with heating elements fabricated in the base of the pan. Such a device is often cumbersome to use and difficult to clean since the heating elements are embedded in the pan and may be harmed by being immersed in water.

Other prior art devices attempt to overcome the cumbersome nature of the covered pans by hingeing the cover to the pan and removing the cover when it is not being used, thus allowing the cover to be easily cleaned. The cover of these prior art devices, however, are not heated by a heating element and thus cannot be used for any purpose other than covering the heated pan.

SUMMARY OF THE INVENTION

An object of the present invention is to provide a new and improved device for cooking food.

Another object of the present invention is to provide a new and improved device for cooking omelettes whereby two pans are partially filled with egg batter, and other ingredients, if desired, and cooked for a predetermined period of time. After an initial period, one half of the omelette can be flipped onto the other half merely by rotating one pan about a central hinge.

A further object of the present invention is to provide a new and improved cooking device including parts that may be interchanged for left or right hand use.

A further object of the present invention is to provide an omelette cooker including a pivoted pan portion which can be used to cover the omelette for a "steamed" omelette or removed for conventional omelette cooking.

A further object of the present invention is to provide a cooking device comprising two generally rectangular pans, the shape thereof facilitating the "flipping" of one half of the omelette onto the other.

A further object of the present invention is to provide a new and improved cooking device in which the pans are completely removable to facilitate serving of food products and washing or cleaning of the elements after use.

The above and other objects of the present invention are achieved in the cooking device hereinafter described which includes a base or support member for supporting the cooking device on a surface such as a kitchen countertop. A cast grid element including an embedded electrical heating device is mounted on top of the support member and includes a pair of insulated handles at its opposite ends to facilitate safe carrying when the grid has become heated. A power cord extends from one side for connection to a source of electrical power. The cast grid includes a plurality of integrally molded guide means which define two locations into which two heat conductive cooking pans may be positioned. Both of the pans preferably are coated with a non-stick inner cooking surface. One pan includes a substantially elongated insulating handle for grasping by the user to serve food products. A second pan includes a somewhat smaller insulating handle mounted on an edge of the second pan so as to be generally at right angles with the first pan when the two pans are positioned in the defined locations. The second pan also includes a flange which is adapted to be removably coupled by a hinge also formed integrally, generally in the center of the cast grid. Accordingly, the two pans may be positioned in the grid and used, as described above, specifically in the preparation of omelettes. The scope of the protection defined by the claims appended hereto shall not be limited to the above description since the cooking device as defined and described hereinafter, can be used in the preparation of many additional food products.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 1 is a perspective view of the device of the present invention;

FIG. 2 is a top plan view of the device of the present invention with the pans located for a right handed user;

FIG. 3 is a top plan view on a reduced scale of the device of the present invention with the pans shown in the left handed user position;

FIG. 7 is a plan view of the cover pan of the device of the present invention;

FIG. 8 is a plan view of the bottom pan of the device of the present invention; and FIG. 9 is a vertical section taken generally along line 9—9 of FIG. 2.

DESCRIPTION OF THE PREFERRED EMBODIMENT

Figure 4:
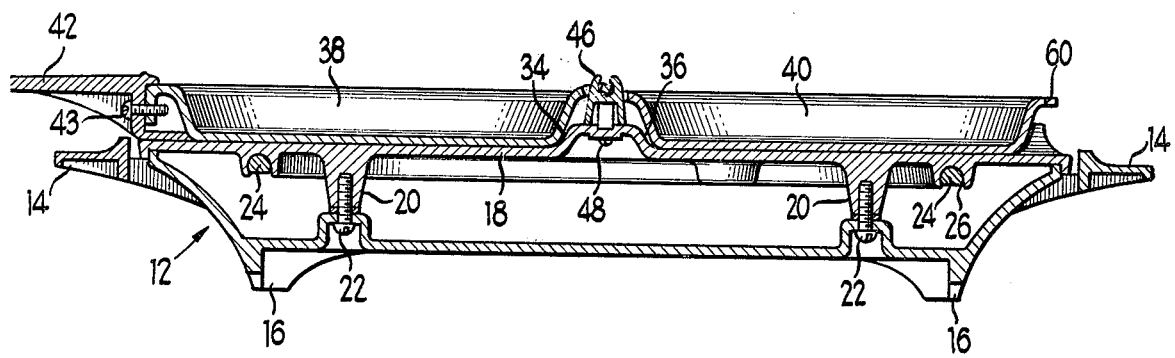
FIG. 4 is a vertical section taken along line 4—4 of FIG. 1.
Figure 5:
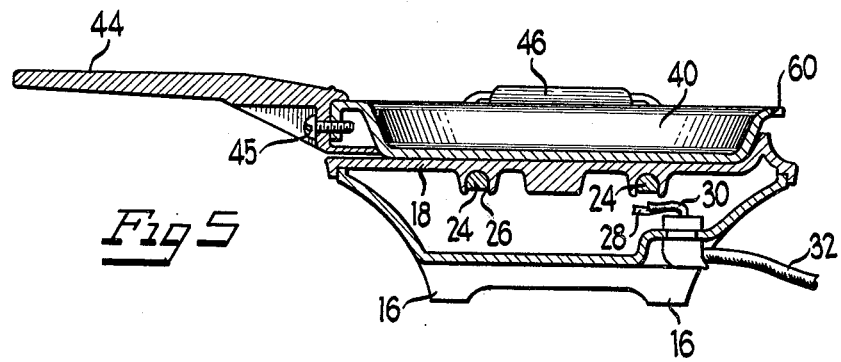
FIG. 5 is a vertical section taken along line 5—5 of FIG. 1.

Having reference now to the drawings, there is illustrated a cooking device generally indicated by the reference numeral 10 constructed in accordance with the principles of the present invention and intended to cook foods, such as omelettes. The cooking device 10 includes a base or support member, generally designated by the reference numeral 12 fabricated from heat insulating material. The base 12 includes integrally formed handles 14 on two ends thereof to allow the entire cooking device 10 to be carried by the user if so desired. In addition, there are integrally formed legs 16 on which the base 12 is mounted and which engage a surface on which the device 10 is positioned such as a countertop in a kitchen.

Heat conducting means such as a cast heating grid 18 is secured to the base 12 through the employment of a plurality of integral posts or extensions 20 into which fasteners, such as screws 22, are threaded, thus securely connecting the grid 18 to the base 12. Electrical heating elements 24 may be secured within a channel 26 formed in the bottom of the grid 18 by staking or other suitable methods known in the art. The heating element 24 may be connected to a thermostat (not shown) or other device known in the art that in turn is connected by leads 28 and 30 to a power cord 32 that may be connected to a source of electrical energy for energizing the heatng element 24. The heating element will maintain the grid 18 at a preset temperature.

Figure 6:
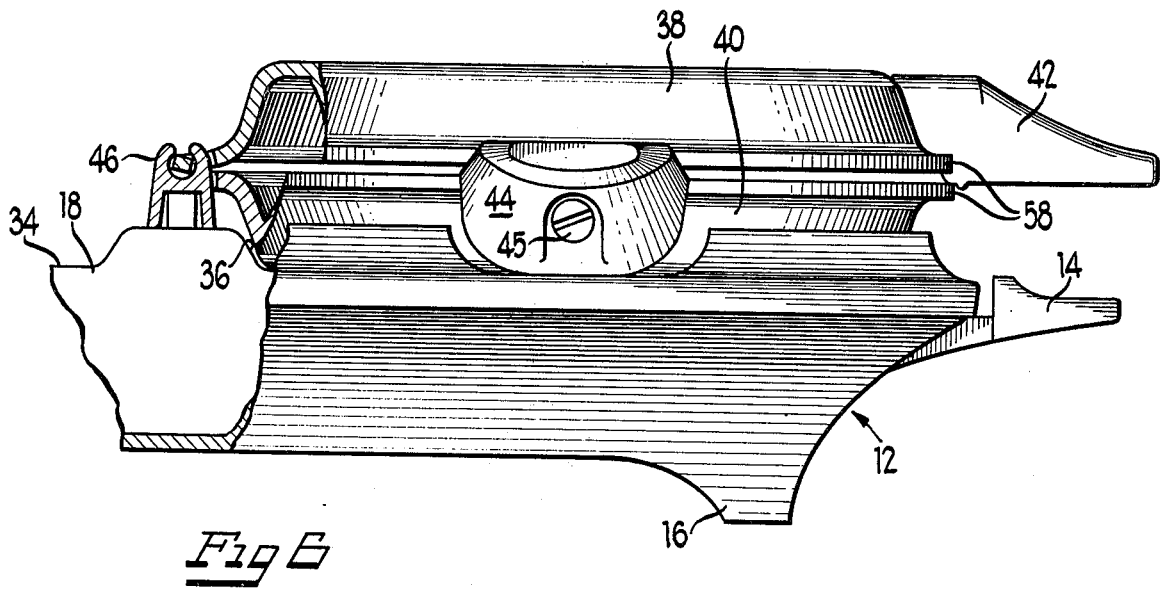
FIG. 6 is an enlarged, partially fragmented view of the device of the present invention with pans in the closed position.

First 34 and second 36 cooking locations are defined on the upper surface of the grid 18 by a lip or flange and are of a configuration and size to encompass and locate first 38 and second 40 heat conductive pans. These pans 38 and 40 serve to cook food such as omelettes or the like when placed therein. The pan 38 includes a short handle 42 fabricated from heat insulating material and secured to the pan 38 by a fastener or screw 43. The other pan 40 includes a long handle 44 secured thereto by a fastener or screw 45. The handle 44 may be grasped by the user, for example, for carrying the pan 40 to remove it from grid 18 when the food is cooked. In the configuration illustrated, for example in FIGS. 1 and 2, the pans 38 and 40 are generally rectangular in shape and are positioned on top of the cast grid 18 and and in the designated locations 34 and 36 to be heated by the heating element 24 to cook food as desired. If it is desired to turn and cook food in a covered pan, such as when turning or flipping an omelette, a hinge 46 is provided to pivot the pan 38. The hinge 46 is secured to the upper surface of the grid 18 by a fastener 48 (FIG. 4) and defined by a pair of side flanges 49 which form an elongated, generally "C" shaped, open top slot 50. The pan 38 (FIG. 7) includes a horizontal flange 52 having an elongated slot 54 defined therein and a web portion 56 adjacent the slot 54. To position the pan 38 onto the grid 18, the web 56 is passed into the slot 50 of the hinge 46 so as to position the slot 54 of the flange 52 in position to pivot over a side flange 49 as illustrated in phantom in FIG. 9. In this configuration, if it is desired to cook food in the covered pan 40 or to flip an omelette to the folded configuration, the handle 42 may be grasped and the pan 38 pivoted about the hinge 46 to a position covering the pan 40 as illustrated, for example, in FIG. 6.

The pans 38 and 40 each have an upper flange 58 about the periphery with two indented portions 60. The pan 40 differs, however, from the pan 38 in that the flange 52 is not included. The indentions 60 allow the pan 40 to be positioned in either of two locations 34 and 36 of the grid 18 without engaging or interfering with the hinge 46. For example, if a left handed user wanted to use the cooking device 10, the pan 40 would be positioned in the left position 34 of the cooking grid 18 and the pan 38 would be placed in position 36 with the flange 52 inserted over the hinge 46 and into the slot 50 (FIG. 3). Once this is accomplished, the pan 38 may be pivoted about the hinge 46 in the opposite direction onto the pan 40 thus providing a reversible cooking unit.

FIG. 9 shows a vertical section of the pivoted pan 38 taken through the flange 52. From this view, it can be seen that the web portion 56 on the outside off the slot 54 is curved or bent downwardly adjacent the slot 54 to facilitate the insertion of the web 56 into the hinge slot 50. In addition, the specific angle of the web 56 prevents binding of the web within the slot 50 as the pan is pivoted to flip one half of the omelette onto the bottom half in the pan 40.

Thus, as described in the foregoing detailed description of the preferred embodiment, it can be seen that the present invention provides a novel cooking device which can be used for making omelettes. Specifically, when the inner surfaces of the pans are provided with a non-stick surface, the rectangular shape thereof plays an important part in facilitating the flipping of the omelette. The edge of the rectangular pan, adjacent the hinge or flange 52 supports one half of the omelette during the flipping or pivoting operation along its entire length and prevents the omelette from "sliding out" of the pan. In addition, once flipped, the pivoted pan 38 may rest on the serving pan 40 to provide a "steamed" effect for the omelette. Conversely, the pivoted pan 38 may be removed to produce a conventional omelette.

The reversible nature of the pans and the grid, including mirror image cutouts on both sides of the hinged portion, facilitates the left hand or right hand use. In addition, both of the pans can be made in essentially the same mold since the side cutouts 60 are the same for both pans. Thus, the overall cost can be substantially reduced. In both the left and right hand use, as shown in FIGS. 2 and 3, the electrical cord always extends from the rear of the support member or base 16 for safety and convenience.

Many modifications and variations of the present invention are possible in light of the above teachings. Thus, it is to be understood that, within the scope of the appended claims, the invention may be practiced other than as specifically described above.

I claim:

1. A food preparation device, comprising:
   heat conductive means for conducting heat and providing a support surface;
   means for heating said heat conductive means;
   means for containing food including first and second conductive pans, said pans being removably mounted in heat conductive relationship on said heat conductive means; and
   hinge means defined on said heat conductive means for hingedly connecting (said containing means) at least one of said pans to said heat conductive means, said hinge means comprises a slotted flange on said pan and a pair of adjacent, upwardly directed flanges on said heat conductive means for alternate insertion into said slotted flange.

2. The food preparation device of claim 1 wherein said heat conductive means comprises a heat conductive platen defining at least one mating location into which said containing means is positioned.

3. The food preparation device of claim 1 wherein at least one of said pans includes a manually graspable handle.

4. An omelette cooker, comprising:
   a heat insulating base for supporting said cooker on a suitable surface;
   a heating grid mounted on said base, said grid including a heating element and guide means defining first and second cooking positions thereon;
   a hinge defined between said first and second cooking positions; and
   first and second containers, said containers being adapted to be removably placed and located by said guide means in said cooking positions, at least one of said containers including a hinge attachment portion for removably attaching one of said containers to said hinge whereby the hinged container can be pivoted onto the other to make a folded omelette, said hinge means comprises a slotted flange on said container and a pair of adjacent, upwardly directed flanges on said heating grid for alternate insertion into said slotted flange.

5. The omelette maker of claim 4 wherein said first and second containers comprise heat conductive pans.

6. The omelette maker of claim 4 or 5 wherein at least one of said first and second containers includes a handle for grasping and for carrying said one of said first and second containers.

7. The omelette maker of claim 4, wherein said hinge attachment portion comprises an apertured flange on at least one of said containers and (the pan and said hinge comprises) a pair of generally upwardly directed, inward curved flanges on said heating grid providing an open "C" shaped slot directed generally transversely between said first and second cooking positions for receiving said apertured flange.

8. The omelette maker of claim 7 wherein said apertured flange includes an elongated slot for alternatively receiving one of said flanges.

* * * * *

UNITED STATES PATENT AND TRADEMARK OFFICE
CERTIFICATE OF CORRECTION

PATENT NO. : 4,176,593
DATED : December 4, 1979
INVENTOR(S) : Rouben T. Terzian

It is certified that error appears in the above-identified patent and that said Letters Patent are hereby corrected as shown below:

Claim 1, line 10, "(said containing means)" should be deleted.

Claim 7, lines 3 and 4, "(the pan and said hinge comprises)" should be deleted.

Signed and Sealed this

Twenty-fifth Day of March 1980

[SEAL]

Attest:

SIDNEY A. DIAMOND

Attesting Officer

Commissioner of Patents and Trademarks